United States Patent Office

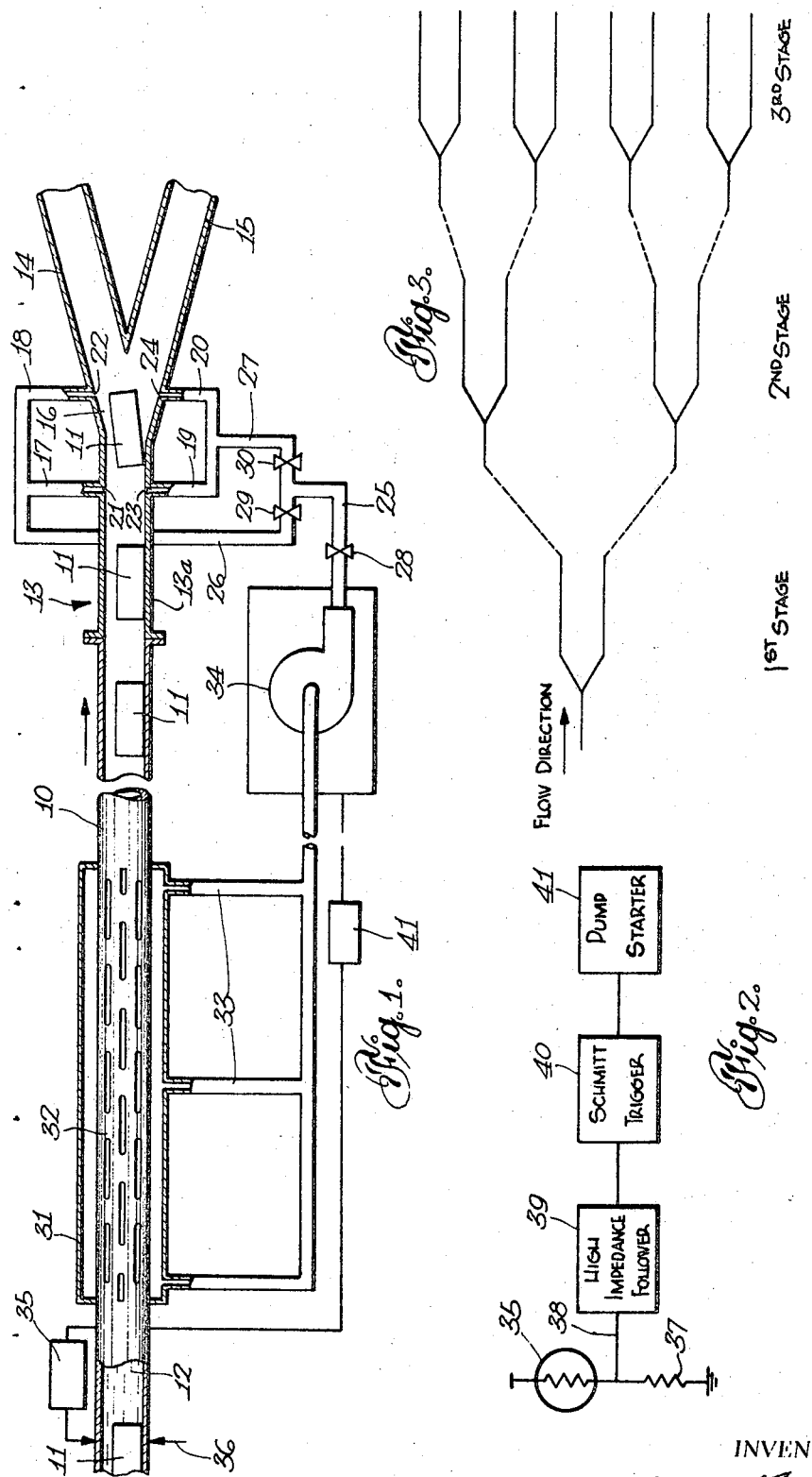

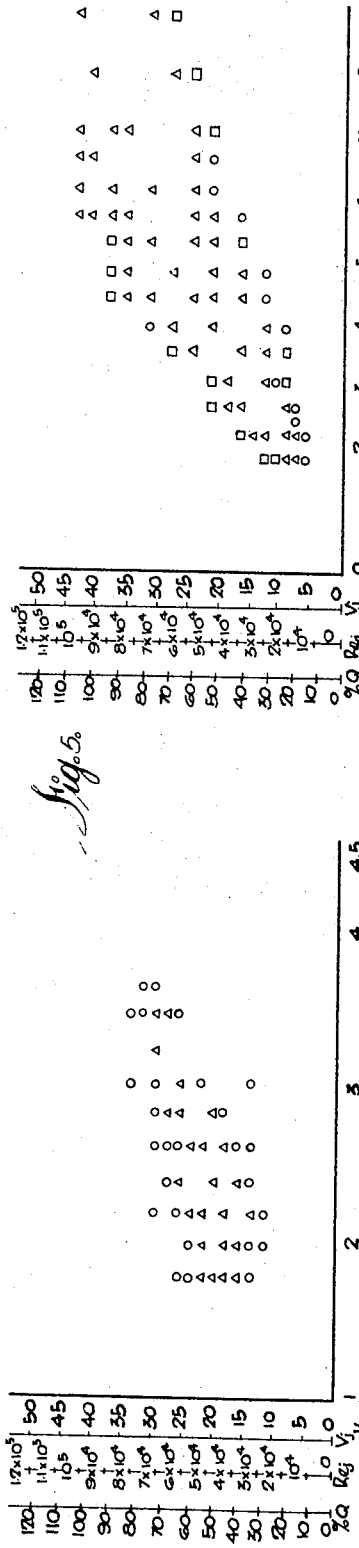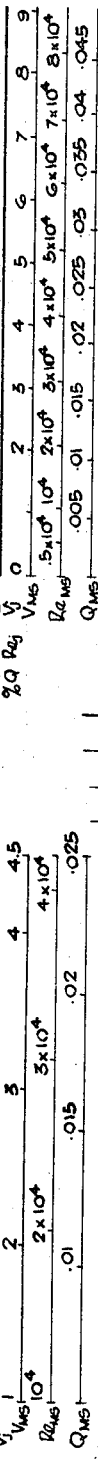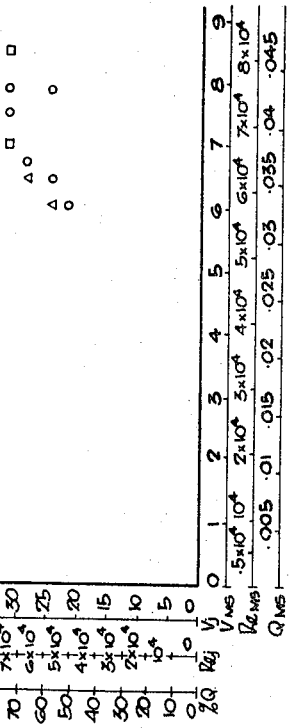
Fig. 5.
Fig. 6.
Fig. 4.
INVENTOR
George F. Round
BY
Weir, Marshall, Mackae & Lamb
PATENT AGENT

3,556,604
Patented Jan. 19, 1971

---

3,556,604
METHOD AND APPARATUS FOR DIRECTION OF SOLID BODIES IN PIPELINE TRANSPORTATION
George F. Round, Burlington, Ontario, Canada, assignor to Research Council of Alberta, Edmonton, Alberta, Canada, a body corporate
Filed Oct. 31, 1968, Ser. No. 772,338
Claims priority, application Canada, Dec. 5, 1967, 6,787/67
Int. Cl. B65g 53/00
U.S. Cl. 303—2                                11 Claims

ABSTRACT OF THE DISCLOSURE

The invention relates to a method and means for diverting some or all of a plurality of large solid bodies being tranported in successive order in a stream in a pipeline into another pipeline stream or to separate the bodies into a plurality of other pipeline streams. The diversion is effected by selectively injecting jets of liquid into the pipeline for impingement on the bodies at a suitable location.

BACKGROUND OF THE INVENTION (1) Field of the invention

The invention is in the general field of pipeline transportation of large solid bodies in single file. The invenvention is specifically directed to a switching procedure for diverting some or all of the bodies into branch lines.

(2) Description of the prior art

There is a substantial volume of prior art relating to the single file transportation of solid bodies in a pipeline stream.

There does not appear to exist in the prior art, however, any disclosure of means for selectively diverting one or a group of bodies from a main pipeline stream into a branch line stream or for selectively diverting groups of bodies from a main pipeline stream into two or more branch line streams.

SUMMARY OF THE INVENTION

The invention proposes to divert one or more bodies of a single line train of solid bodies in a pipeline stream into either one of a pair of branch lines by selectively injecting jets of liquid into the pipeline for impingement upon the bodies at a location adjoining the entrance of the branch lines to divert the bodies into a selected one of the branch lines.

The switching device employed in accordance with the invention may comprise a Y pipe fitting having a first section adapted to be connected to the pipeline, two branch sections, and a diverging section leading from the first section to the branch sections. Liquid injection means are provided and comprise two pairs of jets each having an outlet in the fitting, each outlet having an axis perpendicular to the axis of the first section. One of the outlets of each pair is located in the first section and the other in the diverging section. Each outlet of one of the pairs of jets is in axial alignment and diametrically opposite an outlet of the other of the pairs of jets. Means are provided for selectively supplying injection liquid under pressure to each pair of jets.

BRIEF DESCRIPTION OF THE DRAWINGS

FIG. 1 is a plan view, in partly diagrammatic form, of an apparatus in accordance with the invention, FIG. 2 is a wiring diagram of a suitable photosensing device for use in the apparatus, FIG. 3 is a diagram illustrating one adaptation of the invention, and FIGS. 4, 5 and 6 are charts showing the results of experimental tests.

DESCRIPTION OF THE PREFERRED EMBODIMENTS

In the drawing, 10 is a uniaxial pipeline in which solid bodies, such as a train of cylindrical capsules 11, are being transported in a carrier liquid 12. Each article 11, as shown, has a maximum cross-sectional dimension greater than the radius of the pipeline.

A Y pipe fitting 13 is connected to the pipeline at the downstream end thereof and includes a first constant diameter uniaxial section 13a, two branch sections 14 and 15 each of approximately the same diameter as that of the pipeline, and an intermediate diverging section 16 leading from the first section to the branch sections. Section 13 is in axial alignment with the pipeline.

Two pairs of injection jets 17, 18 and 19, 20 are disposed with their axes in perpendicular relation to the axis of section 13a. These jets have respective outlets 21, 22 and 23, 24 in the fitting. Jet 17 is axially aligned with and diametrically opposite jet 19 and jet 18 is axially aligned with and diametrically opposite jet 20. Thus, the jets of each pair are parallel and common-directional.

Outlets 21, 23 of jets 17 and 19 are located in section 13a closely adjacent section 16 and outlets 22, 24 of jets 18 and 20 are located in section 16, outlet 22 being at the entrance to branch section 14 and outlet 24 being at the entrance to branch section 15.

Means for feeding liquid to the jets comprises a pipe 25 having a branch 26 leading to jets 17 and 18 and a branch 27 leading to jets 19 and 20. Flow control means comprises a throttling valve 28 inpipe 25, valve 29 in branch 26 and valve 30 in branch 27.

A portion of the carrier liquid 12 in pipeline 10 may be withdrawn to provide the liquid to be ejected through the jets described. For this purpose, a cylindrical manifold 31 surrounds a perforated section 32 of the pipeline and pipe 25 is connected to the manifold by means of a plurality of lines 33.

A centrifugal pump 34 in pipe 25 provides the required liquid pressure for the jets.

Means for automatically controlling operation of the pump 34 are preferably provided and, as shown, comprise a photo-sensing device 35 adapted to be triggered by interruption of a light beam 36 extending diametrically across the pipeline and opposite the device 35. Interruption of the beam occurs by passage of a leading capsule of a train of capsules moving through the pipeline.

The photocell 35 may be of conventional form such as that manufactured by Texas Instruments Company under the trademark "LS–400," one side of which may be maintained at ±28 volts and the other side grounded via a resistor 37 of the order of 30,000 ohms. The output of the signal may be taken from a tap 38 between the resistor and the photocell into a high impedance follower 39 and thence to a Schmitt trigger 40 for transmission to the pump starter 41.

In the general operation of the device, the throttling valve 28 is adjusted to provide an injection rate such that the main stream and the jet injection velocities fall within suitable operational areas.

If the train of transported bodies is to be diverted into branch 14, valve 30 is closed and valve 29 opened to place jets 21 and 22 in operation and to cause the liquid streams ejected thereby to impinge upon the bodies and direct them into branch 14. If the train of bodies is to be diverted into branches 15, valve 29 is closed and valve 30 is opened to place jets 19 and 20 in operation with resultant direction of the bodies into branch 15.

It will be apparent that valves 28, 29 and 30 may be subject to manual or automatic operation as desired.

It will be apparent that each branch section 14 and 15 must diverge from the axis of main section 13a at a suitably chosen angle which will permit effective diversion of the trains of capsules. This angle will normally be in the range of about 5° to 20°. In other words, the included angle between the branch section axes will normally be in the range of about 10° to 40°. A suitable angle between the branch sections has been found to be about 20°.

FIG. 3 shows diagrammatically a pattern for separating trains of capsules from a single stream into eight streams utilizing devices in accordance with the invention. As shown in the illustrated example, three stages are employed.

It will also be apparent from the velocities of the main carrier stream and of the jet streams, as well as the relation therebetween, will be chosen in order to provide most efficient and effective operation.

An unusual and unexpected feature of the invention resides in the fact that the solid bodies are diverted into the branch adjoining the side of jet injection and not into the opposite branch.

In order to illustrate the fact that the stated velocities may readily be plotted having regard to attendant conditions, as well as to illustrate the unexpected feature mentioned above, a series of experiments were conducted in the following manner.

Three sets of capsules, of varying train lengths (6–30), were used as follows:

(a) steel spheres, diameter 7/8 inch, density 7.7 g./cc.;
(b) "Lucite" (the trademark of E. I. du Pont de Nemours Company) cylinders, ellipsoid-shaped nose, length 2 7/8 inches, diameter 3/4 inch, density 1.2 g./cc.;
(c) steel cylinder, ellipsoid-shaped nose, diameter 3/4 inch, length 2 7/8 inches, density 7.8 g./cc.

The test apparatus was generally similar to that shown in FIG. 1, the pipes being transparent for observation. The interior diameter of the main stream pipe and of the branches (corresponding to 10, 14 and 15) was one inch. The injection jet holes were 1/4 inch in diameter. Each branch diverged from the axis of the main stream pipe at an angle of 10°.

The results of the tests are shown in FIGS. 4, 5 and 6, corresponding to capsules (a), (b) and (c), respectively. In these figures:

$V_{MS}$=velocity of the main stream in ft./sec.
$Re_{MS}$=Reynolds number corresponding to $V_{MS}$
$Q_{MS}$=quantity of liquid flowing in main stream in cu. ft./sec.
$V_j$=jet velocity
$Re_j$=Reynolds number corresponding to $V_j$
$Q_j$=quantity of liquid flowing through jets per second as a percentage of $Q_{MS}$
△=deflection of whole train into branch adjoining jets
o=occurrence of a divided train
□=jamming of capsules in diverging area.

It will be apparent that, in each case, an operational area, in which all the triangles lie, may readily be plotted wherein for any combination of main stream and jet velocity, an entire train of bodies will be consistently deflected into a chosen channel or branch which will be on the injection side of the jets. This is an unexpected result, as previously mentioned, since from momentum consideration it would be expected that apart from division of the solids, all the bodies would be diverted in a direction away from the ejection jets, that is; into the branch opposite to the side of the jets.

I claim:
1. In combination with a pipeline for transportation in a carrier liquid of single line trains of solid articles each having a maximum dimension greater than the radius of said pipeline, a switching device for selective direction of said trains comprising a Y pipe fitting having a first section adapted to be connected to said pipeline, two branch sections, and a diverging section leading from said first section to said branch sections, liquid injection means comprising a liquid supply pipe, and two pairs of jets each having an outlet in said fitting, said liquid supply pipe having a branch leading to each said pair of jets, and a control valve in each said branch for selective supply of injection liquid through one or the other of said pairs of jets, each said outlet having an axis perpendicular to the axis of said first section, one of said outlets of each pair being located in said first section and the other of said outlets of each pair being located in said diverging section, each outlet of one of said pairs of jets being in axial alignment and diametrically opposite an outlet of the other of said pairs of jets.

2. A switching device for diverting solid articles being transported in a pipeline into branch lines which comprises a pipe fitting having a constant diameter uniaxial section, a pair of branch sections having substantially the same diameter as that of said uniaxial section, and a diverging section leading from said uniaxial section to said branch sections, and liquid injection means comprising a liquid supply pipe, and two pairs of jets each having an outlet in said fitting, said liquid supply pipe having a branch leading to each said pair of jets, and a control valve in each said branch for selective supply of injection liquid through one or the other of said pairs of jets, each said outlet having an axis substantially perpendicular to the axis of said uniaxial section, one of said outlets of each pair being located in said uniaxial section and the other of said outlets of each pair being located in said diverging section.

3. A switching device as defined in claim 2, including a pump in said supply pipe, and a throttling valve in said supply pipe downstream of said pump for controlling the velocity of liquid supplied to said branches.

4. A switching device as defined in claim 1, including means for withdrawing a ortion of said carrier liquid from said pipeline and for supplying said withdrawn liquid to said supply pipe to serve as said injection liquid.

5. A switching device as defined in claim 4, said means comprising a perforated section of said pipeline, a manifold enclosin gsaid perforated section, and pipes connecting said manifold with said supply line upstream of said pump.

6. A switching device as defined in claim 2, including means controlling flow of liquid in said supply pipe and supply injection liquid to said jets comprising a pump in said supply pipe, a photosensing device responsive to passage of solid bodies through said pipeline, a starter for said pump, and means responsive to a signal from said photosensing device for actuating said starter.

7. A switching device as defined in claim 1, including a Y pipe fitting connected to each of said branch sections and being of substantially the same form as said first Y pipe fitting, said second Y pipe fitting also having associated therewith liquid injection means substantially the same as said first injection means.

8. A switching device as defined in claim 2, the axis of each said branch section being at an angle of about 5° to 20° to the axis of said first section.

9. A switching device as defined in claim 8, said angle being about 10°.

10. In a method of transporting in a carrier liquid in a uniaxial pipeline solid articles each having a maximum cross-sectional dimension greater than the radius of said pipeline, the step which comprises directing said articles into a selected one of a pair of diverging branch lines communicating with said pipeline by injecting a pair of parallel common-directional jets of liquid into said carrier liquid for impingement upon said articles therein, one of said jets being directed into said pipeline and the other of said jets being directed into said selected branch at locations adjoining the entrance to said branch from said pipeline.

11. A method of selectively directing single line trains of solid articles as defined in claim 10, wherein said jets are directed substantially perpendicularly to the axis of the said pipeline.

References Cited

UNITED STATES PATENTS

| | | | |
|---|---|---|---|
| 2,993,737 | 6/1961 | Stephen | 302—2 |
| 3,053,276 | 9/1962 | Woodward | 137—81.5 |
| 3,182,674 | 5/1965 | Horton | 137—81.5 |
| 3,219,271 | 11/1965 | Bauer | 137—81.5 |
| 3,458,237 | 7/1969 | Noe | 302—42X |

EVON C. BLUNK, Primary Examiner

D. D. WATTS, Assistant Examiner

U.S. Cl. X.R.

243—29